Nov. 18, 1930.                B. L. McNERNEY                1,782,242
                                ELECTRIC MOTOR
                             Filed July 30, 1928            2 Sheets-Sheet 1

Inventor

*Bernard L. Mc.Nerney*

By *Bradbury & Caswell*
                                    Attorneys

Nov. 18, 1930.    B. L. McNERNEY    1,782,242
ELECTRIC MOTOR
Filed July 30, 1928    2 Sheets-Sheet 2

Inventor
Bernard L. Mc. Nerney
By Bradbury & Caswell
Attorneys

Patented Nov. 18, 1930

1,782,242

UNITED STATES PATENT OFFICE

BERNARD L. McNERNEY, OF MINNEAPOLIS, MINNESOTA

ELECTRIC MOTOR

Application filed July 30, 1928. Serial No. 296,274.

My invention relates to electric motors and has for its object to provide an electric motor in which the speed may be positively controlled.

Another object of the invention resides in providing an electric motor having a stator arranged with two series of electromagnets and having a shaft journaled in said stator and to further provide a number of oscillating elements adapted to oscillate between said magnets for effecting rotational movement of said shaft.

Another object of the invention resides in forming said shaft with a ratchet and in attaching pawls to said oscillating elements whereby rotational movement of said shaft is effected through the oscillation of said elements.

A still further object of the invention resides in providing said shaft with a commutator and a pair of collector rings, one of the terminals of each of both series of magnets being connected to a source of electrical current, the other of the terminals of alternate magnet of both series of magnets being connected to the brush of one of said collector rings, the other terminals of the remainder of said series of magnets being connected to the brush of the other collector ring, said commutator bars being alternately connected to said collector rings and the brush of said commutator being connected to said source of current.

Another object of the invention resides in forming said ratchet with a number of teeth corresponding to the number of commutator bars.

With the foregoing and other objects in view, which will appear in the following description, the invention resides in the novel combination and arrangement of parts and in the details of construction hereinafter described and claimed.

Figure 2:
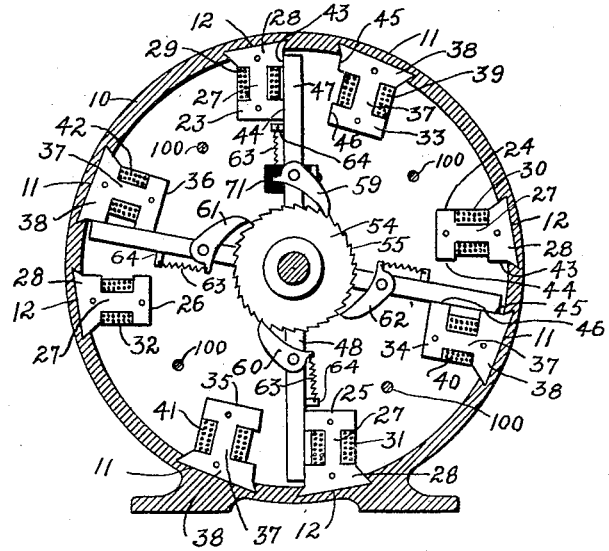
Fig. 2 is a sectional view taken on line 2—2 of Fig. 1.

My invention comprises primarily a stator A and a rotor B. The stator A includes an annular frame 10 constructed of some suitable material having a relatively low permeability such as brass or the like. This frame is formed with two series of inwardly facing dove-tailed slots 11 and 12 relatively spaced to one another as best shown in Fig. 2. Along the edges of the frame 10 the same is recessed as indicated at 13 and 14 to receive two end plates 15 and 16 of usual construction held in place by means of bolts 100. These end plates are formed with bosses 17 and 18 which are fitted with bushings 19 and 20 adapted to journal a shaft 21 forming a portion of the rotor B. Suitable oil cups 22 may be provided if desired for lubricating the bearings in the bushings 19 and 20.

In conjunction with the frame 10 I employ two series of electromagnets 23, 24, 25 and 26 which comprise laminated cores 27 formed with dove-tailed ends 28 adapted to be received within the dove-tailed slots 12 formed in said frame 10. These cores have wound upon them coils 29, 30, 31 and 32 which are energized in a manner to be presently described. In conjunction with the electromagnets 23, 24, 25 and 26 I employ a second series of electromagnets 33, 34, 35 and 36. These magnets are similarly constructed to the others and are preferably of larger dimensions so as to have more tractive effort than the first named series. These magnets are constructed with cores 37 having dove-tailed end portions 38 adapted to be received within the dove-tailed slots 11 of frame 10. Upon these magnets are wound coils 39, 40, 41 and 42 which correspond to the similar coils in the first series of magnets. It will be noted in Fig. 2 that each pair of magnets in the two series are relatively closely spaced and that the same are formed with pole pieces 43 and 44 and 45 and 46.

Figure 1:
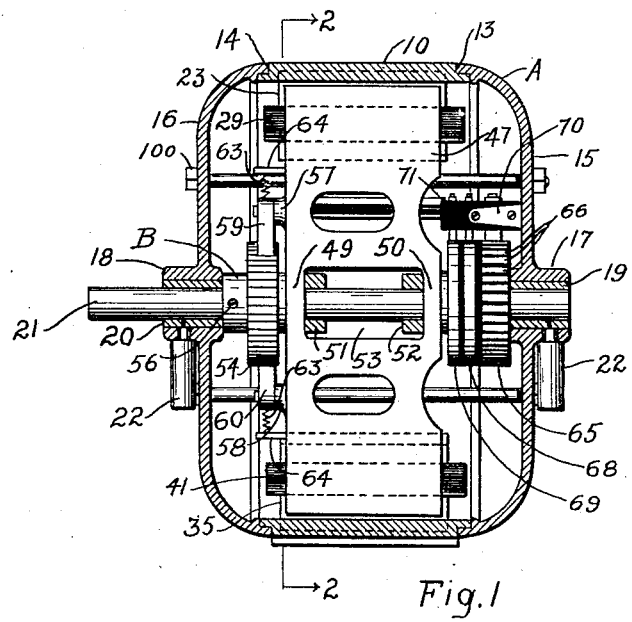
Fig. 1 is a longitudinal sectional elevational view of a motor illustrating an embodiment of my invention.

Upon the shaft 21 is mounted for oscillation two plate-like members 47 and 48. The plate-like member 47 is adapted to extend at one end between the pole pieces of magnets 23 and 33 and at its other end between the pole pieces of the magnets 25 and 35. This member is formed with bearings 49 and 50 which are journaled upon shaft 21. The member 48 is similarly constructed to the member 47 and has one side thereof movable between the pole pieces of magnets 26 and 36 and the other side thereof movable between the pole pieces of magnets 24 and 34. This member is also formed with bearings 51 and 52 similar to bearings 49 and 50 which are disposed within an opening 53 formed in the member 47 as best shown in Fig. 1. With this construction it can readily be comprehended that the members 47 and 48 may be oscillated back and forth between pole pieces 43 and 44 of one of the sets of electromagnets and the pole pieces 45 and 46 of the other set of electromagnets depending upon the manner of excitation of the electromagnets.

For effecting rotational movement of shaft 21 from the oscillatory movement of the members 47 and 48 I mount upon said shaft a ratchet wheel 54 formed with a number of ratchet teeth 55. This ratchet wheel may be secured to shaft 21 by means of a pin 56 or any other suitable structure. The member 47 is formed with two bosses 57 and 58 to which are pivoted two pawls 59 and 60 adapted to engage the teeth 55 of ratchet wheel 54. In a similar manner two pawls 61 and 62 are pivoted to the member 48 which in like manner engage the teeth 55 of the ratchet 54. All of these pawls are held in contact with the teeth of said ratchet by means of tension coil springs 63 which are attached to said pawls and to pins 64 fast on said members. As the members 47 and 48 oscillate the oscillatory movement thereof causes the shaft 21 to rotate through the action of the ratchet wheel 54 and the various pawls operating in conjunction with said members.

Figure 3:
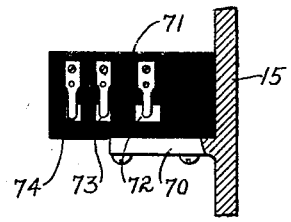
Fig. 3 is a fragmentary detail view of the brush support used in conjunction with my invention.

Upon the shaft 21 in the opposite end of the stator from the ratchet 54 is mounted a commutator 65 constructed with a plurality of commutator bars 66 insulated from one another in the customary manner. In addition to this commutator two collector rings 68 and 69 are employed which are attached to said shaft in close proximity to the commutator 65 and which are insulated therefrom. On the end plate 15 of stator A is formed a bracket 17 which has attached to it a block 71 of insulating material. This block has been shown in detail in Fig. 3 and has mounted in it three brushes 72, 73 and 74 which contact with the commutator 65 and collector rings 68 and 69 respectively.

Figure 4:
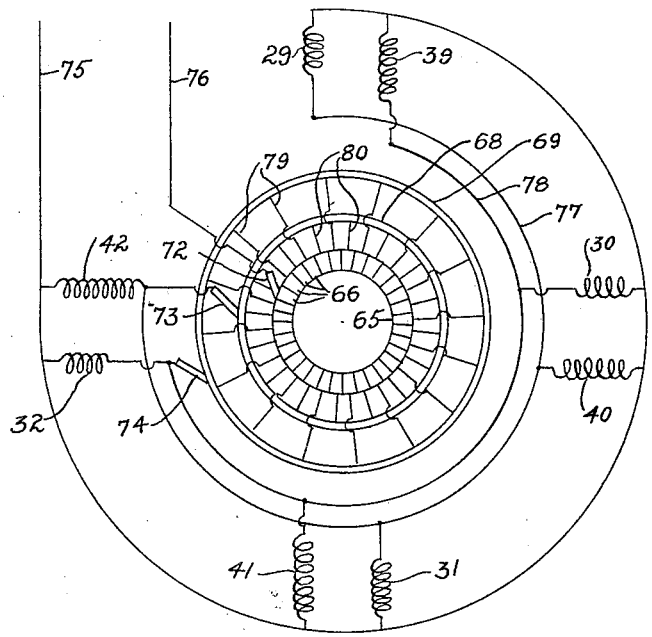
Fig. 4 is a wiring diagram of the motor shown in Figs. 1 and 2.

The manner of wiring my improved motor is shown in Fig. 4. For supplying electric current to the motor I have shown a line having leads 75 and 76 which may be connected to any suitable source of electric current. One of the terminals of all of the coils of the various electromagnets is connected to the lead 75 while the brush 72 for commutator 65 is connected to the lead 76. All of the remaining terminals of the coils 29, 40, 31 and 42 are connected to a conductor 77 which is connected to the brush 74 of collector ring 69. In a similar manner the remaining terminals of the coils 39, 30, 41 and 32 of the other electromagnets are connected to a common conductor 78 which in turn is connected to the brush 74 of collector ring 69. The various commutator bars 66 of commutator 65 are alternately connected to the two rings 68 and 69 by means of leads 79 and 80 so that current is alternately impressed in opposite direction upon the same.

The operation of the motor is as follows: Assuming the brush 72 to rest upon one of the commutator bars 66 which I have indicated at 66' in Fig. 4. This commutator bar being connected through lead 79 with collector ring 69 energizes coils 39, 30, 41 and 32. This causes the member 47 to be oscillated in a clockwise direction and the member 48 in a counter-clockwise direction. Pawls 59 and 16 engaging the ratchet teeth 55 of ratchet 54 operate to rotate the shaft 21 in a partial clockwise direction, while the pawls 61 and 62 slip over the teeth of said ratchet while the member 48 is oscillated in counter-clockwise direction. Movement of shaft 21 changes the position of brush 72 to the adjacent commutator bar. This commutator bar being connected to the other collector ring 68 by means of one of the leads 80, energizes the electromagnets 23, 34, 25 and 36 which reverses the movements of the said members 47 and 48 causing the member 47 to move in a counter-clockwise direction and the member 48 to move in a clockwise direction. This causes the pawls 61 and 62 to engage the teeth 55 of ratchet 54 and to further partially rotate shaft 21 while the pawls 59 and 60 slide over said teeth. In this manner the shaft 21 is given a rotational movement due to the alternating oscillatory movement of the members 47 and 48.

By varying the distance between the two series of electromagnets and by varying the number of ratchet teeth and the number of commutator bars in the commutator, motors of different speeds may be constructed so that the motor may be used in certain instances without reduction gearing. With my improved motor a relatively low speed may be attained with a high torque. The starting torque for my motor is very high so that the motor may be utilized where the same starts under full load. Due to the relatively low speed of the motor the rotor need not be mechanically constructed to such a fine degree of precision as is required in high speed motors and the winding being entirely on the stator insulating problems present with the ordinary type of motors which have the windings on their rotor are eliminated.

Changes in the specific form of my invention, as herein disclosed, may be made within the scope of what is claimed without departing from the spirit of my invention.

Having described my invention, what I claim as new and desire to protect by Letters Patent is:

1. An electric motor comprising a stator, a shaft journaled in said stator, a series of electromagnets mounted within said stator, a second series of electromagnets spaced from said first series of electromagnets, plate-like members mounted for oscillation upon said shaft and adapted to move between the corresponding magnets of the two series of magnets, a commutator on said shaft connected to said magnets for alternately energizing adjoining magnets of each of said series of magnets to cause the oscillation of said plate-like members between said magnets, and means for effecting rotational movement of said shaft through the oscillation of said members.

2. An electric motor comprising a stator, a shaft journaled in said stator, a series of electromagnets mounted within said stator, a second series of electromagnets spaced from said first series of electromagnets, plate-like members mounted for oscillation upon said shaft and adapted to move between the corresponding magnets of the two series of magnets, a commutator on said shaft connected to said magnets for alternately energizing adjoining magnets of each of said series of magnets to cause the oscillation of said plate-like members between the magnets, a ratchet on said shaft and pawls on said plate-like members for effecting rotational movement of said shaft upon oscillation of said members.

3. An electric motor comprising a stator, a shaft journaled in said stator, a series of electromagnets mounted within said stator, a second series of electromagnets spaced from said first series of electromagnets, plate-like members mounted for oscillation upon said shaft and adapted to move between the corresponding magnets of each of the two series of magnets, a commutator on said shaft connected to said magnets for alternately energizing adjoining magnets of each of said series of magnets to cause the oscillation of said plate-like members, a ratchet on said shaft and pawls on said plate-like members for effecting rotational movement of said shaft upon oscillation of said members, said ratchet having a number of teeth corresponding to the number of bars in said commutator.

4. A motor comprising a stator having a series of electromagnets mounted therein, a second series of electromagnets mounted in said stator and spaced from said first series, a shaft journaled in said stator, a plurality of oscillating elements mounted for oscillation upon said shaft, a commutator on said shaft, a pair of collector rings on said shaft, a source of electrical energy, said electromagnets of both series having one of the terminals of each of said magnets connected to one terminal to said source of current, alternate terminals of the other terminals of one of said series of magnets being connected to the brush of one of said collector rings and the remainder of the terminals of said series of magnets being connected to the brush of the other collector ring, the remaining terminals of the other series of magnets being connected to said collector ring brushes in inverse order as compared to those of the first series, the bars of said commutator being alternately connected with said collector rings, the brush of said commutator being connected to the other terminal to said source of electric current, and means for effecting rotational movement of said shaft upon oscillation of said oscillating elements.

5. A motor comprising a stator having a series of electromagnets mounted thereon, a second series of electromagnets mounted on said stator and spaced from said first series, a shaft journalled in said stator, a plurality of oscillating elements movable between said magnets and adapted to be operated thereby, a commutator on said shaft, a source of electric current, said electromagnets of both series having one of the terminals of each of said magnets connected to one terminal of said source of current, a brush for said commutator, the other terminal of said source of current being connected to said brush, and means for connecting the other terminals of one of said series of electromagnets collectively to alternate commutator bars, and for connecting the other terminals of said other series of magnets collectively to the intervening commutator bars.

In testimony whereof I have affixed my signature to this specification.

BERNARD L. McNERNEY.